US010730760B2

(12) United States Patent
Domitrovitsch

(10) Patent No.: US 10,730,760 B2
(45) Date of Patent: Aug. 4, 2020

(54) NATURAL PIPELINE WATER CONVEYANCE SYSTEM AND METHOD

(71) Applicant: HYDRATION COMPANY OF PA, LLC, Northampton, PA (US)

(72) Inventor: Brad J. Domitrovitsch, Northampton, PA (US)

(73) Assignee: Hydration Company of PA, LLC, Northampton, PA (US)

( * ) Notice: Subject to any disclaimer, the term of this patent is extended or adjusted under 35 U.S.C. 154(b) by 4 days.

(21) Appl. No.: 16/115,099

(22) Filed: Aug. 28, 2018

(65) Prior Publication Data
US 2018/0362364 A1    Dec. 20, 2018

Related U.S. Application Data

(63) Continuation of application No. 14/254,315, filed on Apr. 16, 2014, now abandoned.
(Continued)

(51) Int. Cl.
*C02F 1/00* (2006.01)
*C02F 1/66* (2006.01)
(Continued)

(52) U.S. Cl.
CPC ............ *C02F 1/006* (2013.01); *C02F 1/008* (2013.01); *C02F 1/281* (2013.01); *C02F 1/44* (2013.01);
(Continued)

(58) Field of Classification Search
CPC .. C02F 1/00; C02F 1/006; C02F 1/008; C02F 1/44; C02F 1/66; C02F 3/32;
(Continued)

(56) References Cited

U.S. PATENT DOCUMENTS 3,142,639 A * 7/1964 Baer .................... C02F 9/00
                                                      210/765
3,516,931 A * 6/1970 Birch ................... C02F 9/00
                                                      210/713
(Continued)

OTHER PUBLICATIONS

Jeffrey G. Skousen, "A brief overview of control and treatment technologies for acid mine drainage", Presented at the National Meeting of the American Society of Mining and Reclaimation, Jun. 9-13, 2002, pp. 879-899, Published by ASMR, Lexington, KY. (Year: 2002).*
(Continued)

*Primary Examiner* — Joseph W Drodge
(74) *Attorney, Agent, or Firm* — Pepper Hamilton LLP

(57) ABSTRACT

A method of supplying water using a natural water pipeline includes withdrawing impaired water from an impaired water body connected to a waterway and treating the impaired water from the impaired water body to produce treated water. The method also includes discharging the treated water into the waterway and conveying the treated water via the waterway to one or more locations proximate to one or more remote operational facilities that withdraws water from the waterway at the one or more locations. The method further includes receiving a monetary value from one or more operational entities operating the one or more remote operational facilities and providing at least a portion of one or more water access rights to the one or more operational entities in exchange for the monetary value.

8 Claims, 6 Drawing Sheets

Related U.S. Application Data

(60) Provisional application No. 61/812,486, filed on Apr. 16, 2013.

(51) Int. Cl.
  *C02F 3/32* (2006.01)
  *C02F 1/58* (2006.01)
  *C02F 1/28* (2006.01)
  C02F 1/44 (2006.01)
  C02F 103/10 (2006.01)
  C02F 103/06 (2006.01)

(52) U.S. Cl.
  CPC .............. *C02F 1/58* (2013.01); *C02F 1/66* (2013.01); *C02F 3/32* (2013.01); *C02F 2103/06* (2013.01); *C02F 2103/10* (2013.01); *C02F 2209/40* (2013.01); *C02F 2209/42* (2013.01); *C02F 2303/04* (2013.01)

(58) Field of Classification Search
  CPC .............. C02F 2103/07; C02F 2103/10; C02F 2103/34; C02F 2103/365; C02F 2303/04; C02F 2209/40; C02F 1/40; C02F 1/441; C02F 1/58; C02F 1/62; C02F 9/00; C02F 9/005; C02F 2100/00; C02F 2100/20; C02F 2100/30; C02F 2100/32; C02F 2103/06; C02F 2103/36; C02F 2209/42; C02F 2301/00; C02F 2301/04; C02F 2301/043; C02F 2301/08; C02F 1/001; C02F 1/28; C02F 1/281; C02F 1/286; C02F 1/288; C02F 3/00; C02F 3/28; C02F 3/30; C02F 2103/001; C02F 2103/007; C02F 2209/06; B01D 17/12; B01D 21/00; B01D 35/02; B01D 36/00; B01D 37/00; B01D 61/00; B01D 61/02; B01D 61/04; B01D 61/10; B01D 61/14; B01D 61/145; B01D 61/147; B01D 61/16; B01D 61/20; B01D 61/58; E21B 43/00; G06Q 20/00; G06Q 30/00; G06Q 30/06; G06Q 50/00; G06Q 50/06; G06Q 90/00

See application file for complete search history.

(56) References Cited

U.S. PATENT DOCUMENTS

| | | | | |
|---|---|---|---|---|
| 5,863,422 A * | 1/1999 | Watten | ...................... | C02F 1/20 210/150 |
| 5,863,433 A * | 1/1999 | Behrends | ................... | C02F 3/00 210/150 |
| 6,893,570 B1 * | 5/2005 | Hilton, Jr. | ............... | C02F 1/281 210/667 |
| 6,932,909 B2 * | 8/2005 | Rey | ........................... | C02F 9/00 210/698 |
| 8,512,571 B2 * | 8/2013 | Dietz | ...................... | C02F 1/725 210/143 |
| 9,284,621 B2 * | 3/2016 | Eaton | ........................ | B09B 3/00 |
| 2003/0132166 A1 * | 7/2003 | Rey | ........................... | C02F 9/00 210/696 |
| 2006/0218103 A1 * | 9/2006 | Williams | ........... | G06Q 30/0283 705/400 |
| 2007/0045189 A1 * | 3/2007 | Lichtner | .............. | B01D 61/025 210/652 |
| 2009/0204419 A1 * | 8/2009 | Stewart | ................ | B01D 61/025 705/1.1 |
| 2011/0173139 A1 * | 7/2011 | Zauderer | ................ | B01D 53/62 705/500 |
| 2012/0216875 A1 * | 8/2012 | Szydlowski | .............. | C02F 9/00 137/2 |
| 2012/0239211 A1 * | 9/2012 | Walker | ................. | G05B 13/021 700/284 |
| 2012/0284210 A1 * | 11/2012 | Szydlowski | ............ | C02F 1/001 705/500 |
| 2013/0218873 A1 * | 8/2013 | Lassley | ................ | G06Q 10/101 707/722 |
| 2013/0346327 A1 * | 12/2013 | Lassley | ................ | G06Q 30/018 705/317 |
| 2014/0014188 A1 * | 1/2014 | Szydlowski | .............. | E03B 3/30 137/2 |
| 2014/0074734 A1 * | 3/2014 | Lassley | ............. | G06Q 30/0201 705/306 |
| 2014/0224715 A1 * | 8/2014 | Parrish | .................... | C02F 1/281 210/96.1 |
| 2014/0251914 A1 * | 9/2014 | Ball | ......................... | C02F 9/00 210/667 |
| 2015/0104544 A1 * | 4/2015 | Szydlowski | ............. | C12G 1/00 426/66 |

OTHER PUBLICATIONS

Denna Kemp et al, "Mining, water and human rights: making the connection", Journal of Cleaner Production, vol. 18, 2010, pp. 1553-1562. (Year: 2010).*

Krystyna A. Stave, "A system dynamics model to facilitate public understanding of water management options in Las Vegas, Nevada", Journal of Environmental Management, vol. 67, 2003, pp. 303-313. (Year: 2003).*

James J. Murphy et al, "The Design of Smart Water Market Institutions Using Laboratory Experiments", Environmental and Resource Economics, vol. 17, 2000, pp. 375-394, (Year: 2000).*

* cited by examiner

A. Aerobic Wetlands

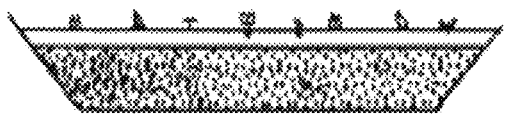

1-3 in. Water
1-3 ft. Organic Matter

B. Anaerobic Wetlands

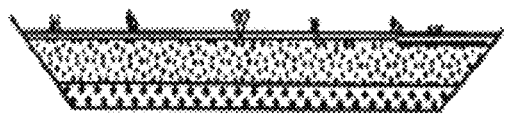

1-3 in. Water
1-2 ft. Organic Matter
.5-1 ft. Limestone

C. Alkalinity Producing Systems (APS)

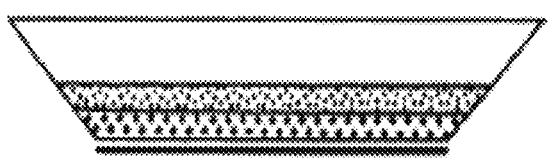

3-6 ft. Water
6-12 in. Organic Matter
1-2 ft. Limestone
Drainage System

D. Anoxic Limestone Drains (ALD)

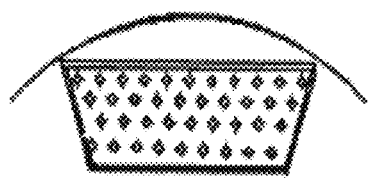

2-4 ft. Soil
20-40 mil Plastic Liner
surrounding or covering LS
Trench or bed of Limestone

E. Limestone Pond

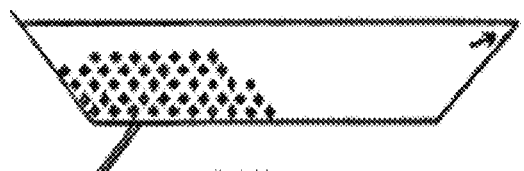

3-6 ft. Water
1-3 ft. Limestone

F. Open Limestone Channel (OPC)

Small or large sized Limestone placed along sides and in bottom of culverts, diversions, ditches, or stream channels.

FIG. 5

NATURAL PIPELINE WATER CONVEYANCE SYSTEM AND METHOD

CROSS-REFERENCE TO RELATED APPLICATIONS

This application is a continuation of U.S. patent application Ser. No. 14/254,315, filed Apr. 16, 2014, which claims priority to U.S. provisional application Ser. No. 61/812,486 filed Apr. 16, 2013, both of which are incorporated herein by reference in their entirety.

TECHNOLOGY FIELD

The present invention relates generally to a water conveyance system and method of supplying water using a natural water pipeline and more particularly to methods and systems to treat water from upstream impaired water sites, convey the treated water to downstream water withdrawing entities and provide water withdrawing rights to the water withdrawing entities in exchange for monetary value.

BACKGROUND

Many end users, such as utility companies, pipeline companies, and municipalities withdraw water from natural water bodies of fresh water for daily use. Some end users, such as natural gas companies, municipalities, and pipeline companies, use large amounts of water during their daily operations. For example, natural gas companies may use water in a technique known as hydraulic fracturing, commonly known as fracing. Fracing includes creating fissures in rocks (e.g. shale) under the surface by a pressurized fluid made up of water, sand and additives to release petroleum, gas (e.g. natural gas) or other substances into a wellbore to be collected at the surface. A typical natural gas well requires a continuous flow of fresh water to operate and may use 3.5 million gallons of water per fracing event. Fracing events may occur multiple times per year, resulting in a large ratio (typically 25-30%) of the cost of operation for the gas company.

The end users typically operate proximate to a fresh water supply, such as a river or stream, to retrieve the continuous flow of fresh water needed for operation. Conditions of the fresh water supply may change during the year, however, which limits or prevents use of the fresh water supply for distribution to the end users. For example, government restrictions (e.g. pass-by restriction) prevent the end users from using the fresh water supply (e.g. a river) if the water supply moves below a certain wa Harleysvilleter level, such as from drought conditions.

To avoid shut down during times when the end users are prevented, or otherwise limited, from using the fresh water (e.g. from pass-by restriction), water from other sources, such as treated water may be transported by truck or pipeline to the end user. The treated water often originates from impaired water bodies, such as acid mine drainage (AMD) water bodies and mine pool water bodies. Conventional systems and methods of supplying water from impaired water bodies include trucking the impaired water and piping the impaired water from the impaired water supplies to treatment and/or storage facilities either at the operation sites or at a remote location from which the treated water is shipped. In either case, costly trucking or piping is used in at least one phase of moving impaired water to the treatment facility and/or the operation sites.

These conventional systems and methods for supplying the water from impaired water bodies are typically inefficient and expensive alternatives. A more efficient and environmental friendly system and method of supplying water to the end users is needed.

SUMMARY

Embodiments of the present invention are directed to a method of supplying water using a natural water pipeline that includes withdrawing impaired water from an impaired water body connected to a waterway and treating the impaired water from the impaired water body to produce treated water. The method also includes discharging the treated water into the waterway and conveying the treated water via the waterway to one or more locations proximate to one or more remote operational facilities that withdraws water from the waterway at the one or more locations. The method further includes receiving a monetary value from one or more operational entities operating the one or more remote operational facilities and providing at least a portion of one or more water access rights to the one or more operational entities in exchange for the monetary value.

In one embodiment, withdrawing impaired water further includes withdrawing impaired water from an acid mined drainage water body.

In another embodiment, withdrawing impaired water further includes withdrawing impaired water from a mine pool water body.

According to an embodiment, providing at least a portion of the one or more water access rights further includes providing a right to withdraw the water at the one or more locations of the waterway when a flow level of the water is less than or equal to a predetermined pass-by water level threshold.

According to another embodiment, providing at least a portion of the one or more water access rights further includes providing a right to withdraw the water at the one or more locations of the waterway until the flow level of the water is less than or equal to a predetermined relief water level threshold that is lower than the predetermined pass-by water level threshold.

In yet another embodiment, receiving a monetary value further includes receiving a monetary value based on an amount of the water to be withdrawn at the one or more locations of the waterway for a predetermined amount of time when a flow level of the water is less than or equal to a predetermined pass-by water level threshold.

In an aspect of an embodiment, the method further includes providing a plurality of selectable water access rights options to withdraw the water at the one or more locations of the waterway. Each of the plurality of selectable water access rights options has a respective monetary value based on a corresponding amount of the water to be withdrawn at the one or more locations of the waterway for a corresponding predetermined amount of time.

In one embodiment, providing at least a portion of one or more water access rights further includes providing a right to withdraw the water at the one or more locations of the waterway with one of: (i) a reduced consumptive use fee; and (ii) a waived consumptive use fee.

In another embodiment, providing at least a portion of one or more water access rights further includes providing one or more credits to the one or more operational entities, wherein each of the one or more credits correlates to an amount of the water to be withdrawn at the one or more locations of the waterway.

According to an embodiment, the method further includes receiving the one or more water access rights from a water rights granting entity and providing at least a portion of the one or more water access rights received from the rights granting entity to the one or more remote operational facilities.

According to another embodiment, the method further includes causing the one or more water access rights to be provided to the one or more remote operational facilities from a water rights granting entity by treating the impaired water and discharging the treated water into the waterway.

According to an aspect of an embodiment, withdrawing of the impaired water from the impaired water body further includes withdrawing free flowing water from the impaired water body.

According to another aspect of an embodiment, withdrawing of the impaired water from the impaired water body further comprises withdrawing stored water from the impaired water body.

Embodiments of the present invention are directed to a method for managing water rights that includes introducing a treated water flow into a waterway from which one or more operational facilities withdraw water. The method also includes receiving, from a water access rights granting entity, one or more water access rights to withdraw the water from the waterway in exchange for introducing the treated water flow into the waterway. The method further includes providing at least a portion of the one or more water access rights to the one or more operational facilities in exchange for a monetary value.

In one embodiment, receiving one or more water access rights includes receiving rights to withdraw the water when a flow level of the water is less than or equal to a predetermined pass-by water level threshold.

In another embodiment, receiving one or more water access rights includes receiving access to the water until the flow level of the water is less than or equal to a predetermined relief water level threshold that is lower than the predetermined pass-by water level threshold.

According to an embodiment, providing at least a portion of the one or more water access rights further comprises providing one or more water access rights credits to the one or more operational facilities. The method further includes permitting the one or more operational facilities to exchange the one or more water rights credits to withdraw an amount of the water when such withdrawal would otherwise not be permitted.

According to another embodiment, receiving the one or more water access rights further includes receiving rights to withdraw an amount of the water downstream from a location where the treated water flow is introduced to the waterway based on an amount of the treated water introduced upstream.

In yet another embodiment, receiving the one or more water access rights further includes receiving rights to withdraw an amount of the water upstream from a location where the treated water flow is introduced to the waterway based on an amount of the treated water introduced to the waterway.

In one embodiment, providing at least a portion of the one or more water access rights further includes providing one or more rights to withdraw the water with one of: (i) a reduced consumptive use fee; and (ii) a waived consumptive use fee.

Embodiments of the present invention are directed to a water treatment and conveyance system that includes a water withdrawing system configured to withdraw impaired water from an acid mined drainage water body and a treatment system configured to treat the impaired water from the acid mined drainage water body to produce treated water. The system also includes a waterway connected to the acid mined drainage water body for conveying the treated water to one or more remote locations of the waterway and a discharge system configured to discharging the treated water into the waterway. The system further includes one or more remote operational facilities configured to withdraw water from the waterway at the one or more remote locations of the waterway.

In one embodiment, the treatment system is a passive treatment system.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 5A through FIG. 5F illustrate portions of exemplary passive systems for use with embodiments of the present invention.

DETAILED DESCRIPTION OF ILLUSTRATED EMBODIMENTS

Figure 1:
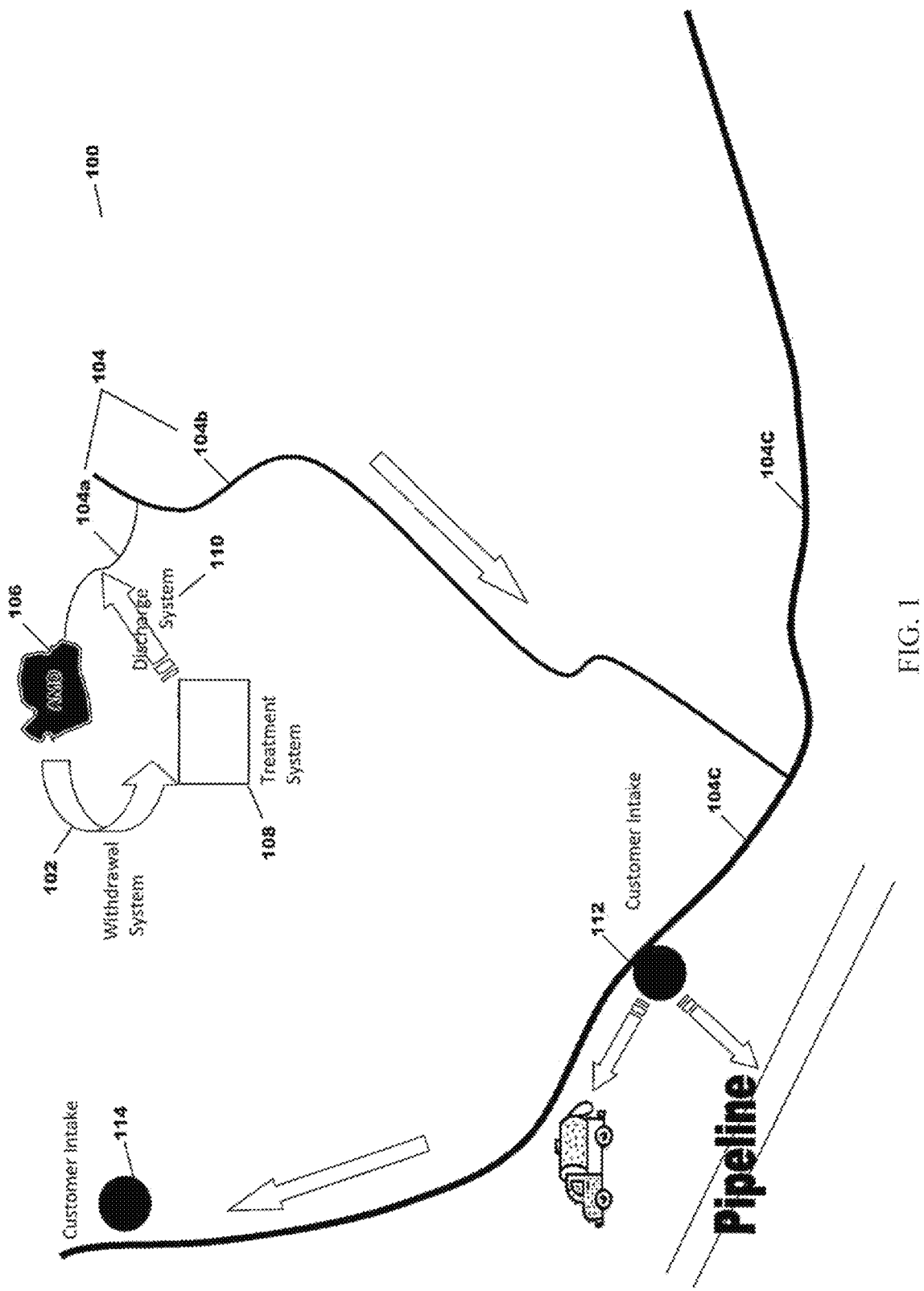
FIG. 1 is a diagram illustrating an exemplary water treatment and conveyance system for use with embodiments of the present invention.

Terms and Concepts Associated with Some Embodiments

Pass-by flow—A Pass-by flow may refer to a flow of water associated with surface-water and ground-water. Certain withdrawal approvals are governed by pass-by flow at a water withdrawal point. A pass-by flow may be a prescribed quantity of flow that must be allowed to pass a prescribed point downstream from a water supply intake. When regulated by federal, state or local authorities, if the natural flow is equal to or less than a prescribed pass-by flow, water may not be withdrawn from the water source and the entire natural flow shall be allowed to pass the point of withdrawal.

Pass-by Relief—Pass-by Relief may refer to relief in the form of increased water withdrawal rights that are provided to a water withdrawing entity based upon their contribution to upstream clean-up efforts.

Waterway—A waterway may refer to a way or channel for water to flow that may include one or more water bodies, such as rivers, creeks and streams. A waterway may also include one or more pools, lagoons, ponds, or other bodies of water. A waterway may be natural, man-made or a combination thereof.

Natural Pipeline—A Natural Pipeline may refer to a water conveyance system that is at least partially formed by a naturally created waterway that water flows through to reach a specific point.

Consumptive Use of Water—Consumptive Use of Water may refer to the loss of water from a ground-water or surface water source through a man-made conveyance system (including such water that is purveyed through a public water supply system) due to transpiration by vegetation, incorporation into products during their manufacture, evaporation, diversion from a body of water or waterway, or any other process by which the water withdrawn is not returned to the body of water or waterway undiminished in quantity.

Withdrawal Permit—A withdrawal permit may refer to an approval, usually from a regulatory body, allowing the holder of the permit to take or remove water from a body of water, such as an AMD water body, waterway, stream, creek, river, etc.

Discharge permit—A discharge permit may refer to an approval, usually from a regulatory body, allowing the holder of the permit to discharge water into a waterway.

Intake—Intake may refer to a point in a waterway from which a water withdrawer withdraws water (intaking it to the water withdrawer).

Passive Treatment System—A passive system may refer to a system of treating water that can function with little or no operation or maintenance over long periods of time. Examples of passive treatment system components include: ponds; wetlands; anoxic Limestone Drains (ALDs)—buried beds of limestone that the water runs through in a controlled manner; vertical Flow Ponds (VFPs)—ponds which are constructed of organic material and limestone that drain through the bottom; and open limestone channels.

Acid Mine Drainage (AMD) water body—An acid mine drainage water body may refer to a body of water formed as a consequence of mining coal or mineral deposits that includes higher acidity levels and precipitation of dissolved metals. The acidity of coal-mine drainage may be caused by the oxidation of the mineral pyrite ($FeS_2$), which is found in coal, coal overburden, and mine waste piles. The rate of pyrite oxidation may depend on reactive surface area of the pyrite, the oxygen concentration and pH of the water, the forms of pyrite, and the presence of Fe-oxidizing bacteria (Thiobacillus ferroxidans).

Impacted Water—Impacted Water may refer to water in a waterway resulting from drainage from impaired water bodies, such as abandoned coal mine water bodies (e.g. mine pools and AMD water bodies).

Abandoned Mine Lands—Abandoned mine lands may refer to lands, waters and surrounding watersheds where extraction, beneficiation or processing of ores and minerals has occurred that pose serious threats to human health and the environment.

Active Mine Lands—Active mine lands may refer to lands, waters and surrounding watersheds where extraction, beneficiation or processing of ores and minerals occur.

Existing Mine Channel—An existing mine channel may refer to a path or stream mine discharge created by impaired water bodies that may be connected to a waterway.

Treated Mine Channel—A treated mine channel may refer to an existing mine channel through which treated impacted waters flow.

Mine Discharge—Mine Discharge may refer to impacted waters that are emitted from a mine, which create a mine channel.

Downstream Surface Water Withdrawal—Downstream Surface Water Withdrawal may refer to a point on a waterway where an intake has been set in place downstream of an impaired water body.

Exemplary Embodiments

As described above, end users, such as utility companies, may need or desire to use water from alternative sources, such as impaired water supplies, when they are prevented from using the fresh water supply proximate to their operational sites. These impaired water supplies include acid mine drainage (AMD) water bodies and mine pool water bodies. AMD water bodies are typically connected to natural waterways that may include rivers, creeks, streams and an existing mine channel. Accordingly, the impaired water from the AMD water bodies spill into the waterways, negatively affecting the natural waterways and reducing or eliminating aquatic life in the natural waterways due to a variety of factors existing in the AMD water, such as high acidity/alkalinity, volatile pH levels, dissolved metal concentration, carbon dioxide concentration, etc. A large number of national waterways, particularly those in mining states such as Pennsylvania and Ohio, are affected by these impaired water bodies. Costs have been estimated around 15 billion dollars in Pennsylvania, alone, to clean up these impaired water bodies impacting an estimated 5,000 miles of streams, without available funds to do so.

Conventional systems and methods of supplying water from impaired water bodies, such as AMD water bodies, may include trucking the water from the AMD sites to the remote sites. Trucking fresh water from remote AMD sites is typically inefficient because transportation costs are incurred from trucking water between the AMD sites, water treatment facilities, and/or the operation sites which use the treated water. Further, storage costs for storing the water at the operation sites are incurred. That is, in addition to treatment costs, conventional methods and systems incur inefficient transportation and storage costs. In addition to these transportation and storage costs, government regulations typically require stored water to meet certain specifications (e.g. Class 2 drinking water specifications), which are often more stringent than those required to discharge treated water into a natural waterway, particularly an impacted waterway. Expensive costs of treating the water from the AMD sites to meet these more stringent regulations are incurred. Operation costs may also include treating the water from the AMD site with chemicals to achieve a pH neutral level during the fracing process. Further, a percentage of the pre-paid fresh water that has been trucked and stored (e.g. in tanks, lagoons and impoundments) at the operation sites evaporate before the water is used for operation, resulting in further increased costs.

Conventional systems and methods of supplying water from impaired water bodies, such as AMD water bodies, may also include piping the water from the AMD sites to the operational sites. Piping the water may also be inefficient because the impaired water sites are typically located far from the operation sites, resulting in a large amount of material (e.g. pipe) costs and associated labor costs needed to lay the pipe between the operation sites and the impaired water sites. Further, both piping and trucking do not release treated water back into the natural waterways proximate to the impaired water sites. Accordingly, the ecosystems proximate to the impaired water sites remain unrestored. One of the concepts disclosed herein is releasing treated water into an impaired waterway which results in an improved water quality, at least due to dilution effect. The entire ecosystem around and downstream of such release are beneficiaries of the treated water.

Embodiments of the present invention are directed to systems and methods of conveying treated water from impaired water bodies to one or more operation sites via a natural water pipeline, such as a waterway that may include rivers, creeks and streams. Embodiments of the present invention provide use of lesser quality of water for hydrocarbon development, reducing the demand on amounts of higher quality of water. Embodiments of the present invention reduce the harmful impact of impaired water (e.g. water from AMD sites) on the environment. Embodiments of the present invention efficiently provide water to end users, potentially at reduced costs, during times when the water would otherwise not be available. Embodiments of the present invention significantly reduce or eliminate end user transportation costs and storage costs associated with conventional trucking and pipeline water conveyance methods.

FIG. 1 is a diagram illustrating a water treatment and conveyance system 100. As shown in FIG. 1, system 100 may include an impaired water site, such as AMD water body 106. Impaired water sites, such as AMD water body 106, may include free flowing water, stored or standing water, or both free flowing water and stored water. The stored water may be stored underground or above ground. For example, water at impacted sites may be stored in underground mines or may be stored in reservoirs or impoundments.

As shown in FIG. 1, the system 100 may include a water withdrawing system 102 for withdrawing impaired water from an impaired water body, such as an AMD water body 106 that is connected to a waterway 104 that includes mine stream 104a, stream 104b and river 104c. The withdrawing system 102 may include a system that transports or pumps the stored water from the impaired water site, such as AMD water body 106, to a location of a treatment system, such as treatment system 108.

Locations of the water bodies 104a, 104b and 104c that makeup the waterway and the geometries of the water bodies 104a, 104b and 104c shown in FIG. 1 are merely exemplary. Other waterways may include any combination of connected streams, creeks, rivers and other water bodies having geometries different than the geometries of the water bodies 104a, 104b and 104c shown in FIG. 1. In some aspects, a waterway may be naturally connected to an impaired water body. For example, the mine stream 104a may be a naturally occurring water body resulting from overflow of the AMD water body 106 and flowing to the stream 104b following the path of least resistance sometimes referred to an existing mine channel. In other aspects, one or more water bodies of the waterway may be man-made. For example, the mine stream 104a may be a man-made canal.

The system 100 may also include a treatment system 108 for treating the impaired water (e.g., the free flowing water and/or the stored water) from the AMD water body 106, producing treated water that may be discharged into the natural waterway for conveyance downstream. The requirements for discharge water specifications will vary based on many factors, including federal regulations, state and local regulations, site location (state, county, town, etc.), land-owner contracts, potential end use, water conditions downstream, environmental concerns/impact, etc. The specifications for dischargeable treated water, and for downstream re-use such as for hydrocarbon development, are typically less stringent than the class 2 drinking water specifications required for storing water. Because the cost to treat the water to dischargeable specifications is typically less than the cost to treat water to storable specifications, the treatment system 108 can be more cost efficient than conventional treatment methods and systems that store water for transportation via truck or pipe from the impaired water sites.

Treatment systems configured to treat the impaired water to meet dischargeable specifications may include passive systems or active systems or a combination of passive and active systems. The treatment system employed may vary in system type, as well as the number and type of treatments employed, from site to site depending on various factors, such as the condition of the impaired water, the required discharge water specifications and the surrounding environment. In some embodiments, the types of treatments may vary during processing, for example where more, less, and/or different treatments are desired as the impaired water changes due to treatment, settling or other factors.

The condition of the impaired water for each specific site may be assessed by performing water sampling for each specific site and may utilize hydrogeological and ground water chemistry studies. The conditions may be tested at several locations and/or times prior to, during, and after treatment. Treatment methodologies employed at a given site may be dependent on various conditions of the impaired water, such as acidity/alkalinity, pH level, dissolved metal concentration, water age/exposure, carbon dioxide concentration, oxygen content, suspended solids content, biological content, such as bacteria, algae, viruses, fungi, etc., minerals such as iron, manganese and sulfur, and other chemical pollutants, etc. Those of skill in the art will readily recognize treatable water conditions and appropriate treatment methodologies.

Figure 2:
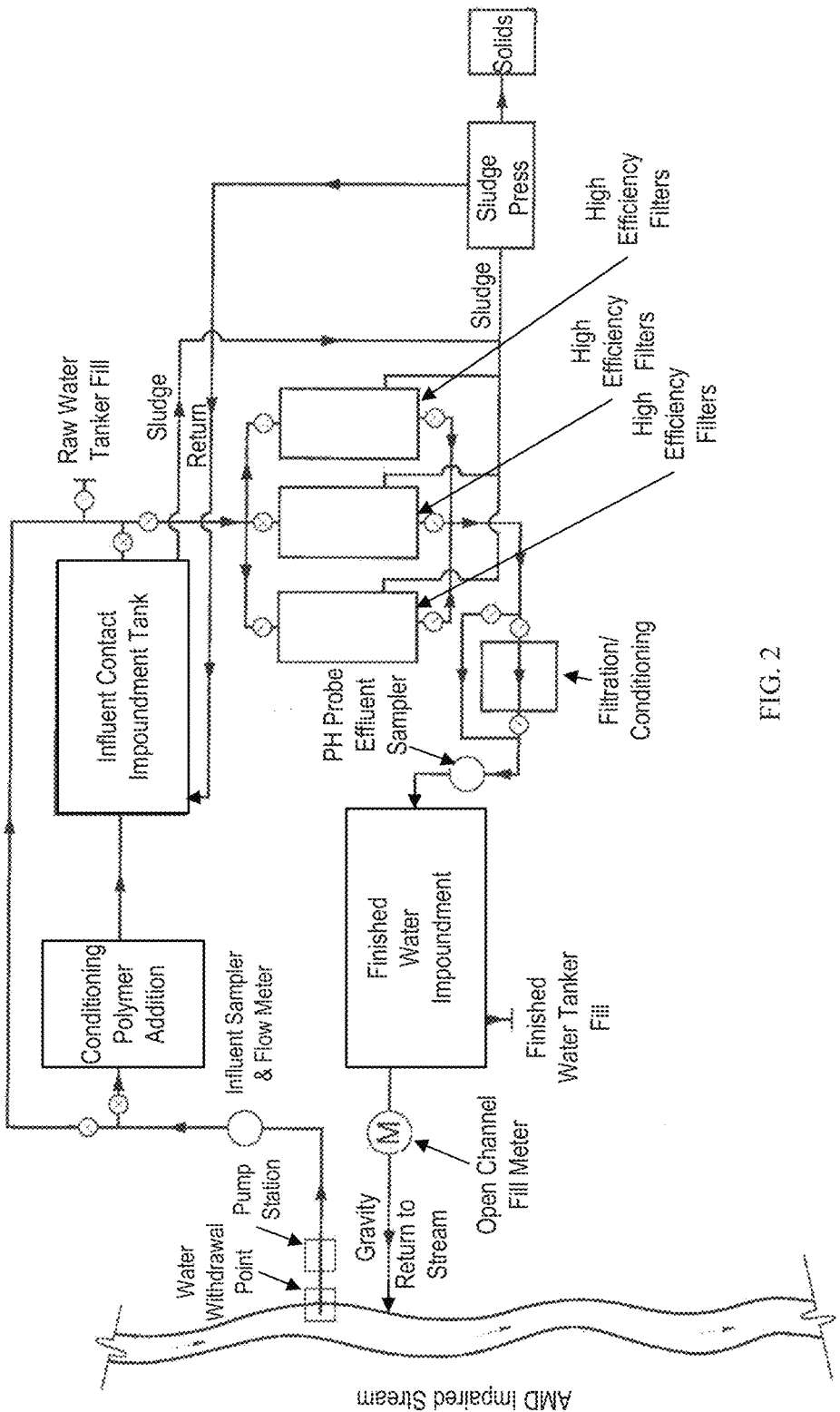
FIG. 2 is a block diagram illustrating an exemplary active treatment system for use with embodiments of the present invention.

Depending on the site, active, passive or a combination of treatment systems may be used. FIG. 2 is a block diagram illustrating an exemplary active treatment system that may be used at one or more specific sites. Notably, impaired water is moved through the system via a variety of pumps and pipes through various treatment and handling sections which may include the addition of chemical or other treatments.

In some embodiments, a passive treatment system may be selected because it often is less costly than active systems of removing metals and acidity from impaired water bodies, such as AMD water bodies. A variety of passive systems may be used that do not require chemical inputs and take advantage of naturally occurring chemical and biological processes to cleanse impaired water bodies. A passive system generally relies on the natural flow of water from the impaired site to the natural water system to move impaired water through the treatment process and on to its final destination. An example of a passive system may include natural beds, such as a lime stone bed and one or more settling ponds. The lime in the limestone beds may adjust the pH level of the impaired water, reducing the acidity level of the impaired water and causing metals to discharge from the impaired water, settling in the settling ponds. Although using a natural limestone bed would be most cost effective, in most instances, a man-made bed or settling ponds may be employed along an existing or newly created waterway to facilitate various treatments. The use of the water's natural flow pattern significantly reduces cost because no, or fewer, pumps, pipes, and tanks are required. Portions of passive systems may include technologies shown in FIG. 5 and may include constructed wetlands, anoxic limestone drains (ALD), successive alkalinity producing systems (SAPS), limestone ponds and open limestone channels (OLC).

Natural wetlands may be characterized by water saturated soils or sediments with supporting vegetation adapted to reducing conditions in their rhizosphere. Constructed wetlands may be man-made eco-systems that mimic their natural counterparts. They may include shallow excavations filled with flooded gravel, soil and organic matter to support wetland plants. Treatment may depend on dynamic biogeochemical interactions as impaired water travels through the constructed wetland. ALDs are abiotic systems that include buried limestone cells that passively generate bicarbonate alkalinity as anoxic water flows through. SAPS combine treatment concepts from both wetlands and ALDs. Oxygenated water is pre-treated by organic matter removing $O_2$ and $Fe^{+3}$. The anoxic water flows through an ALD at the base of the system and limestone ponds may be built over the upwelling of a seep and the seep may be covered with limestone for treatment.

Figure 6:
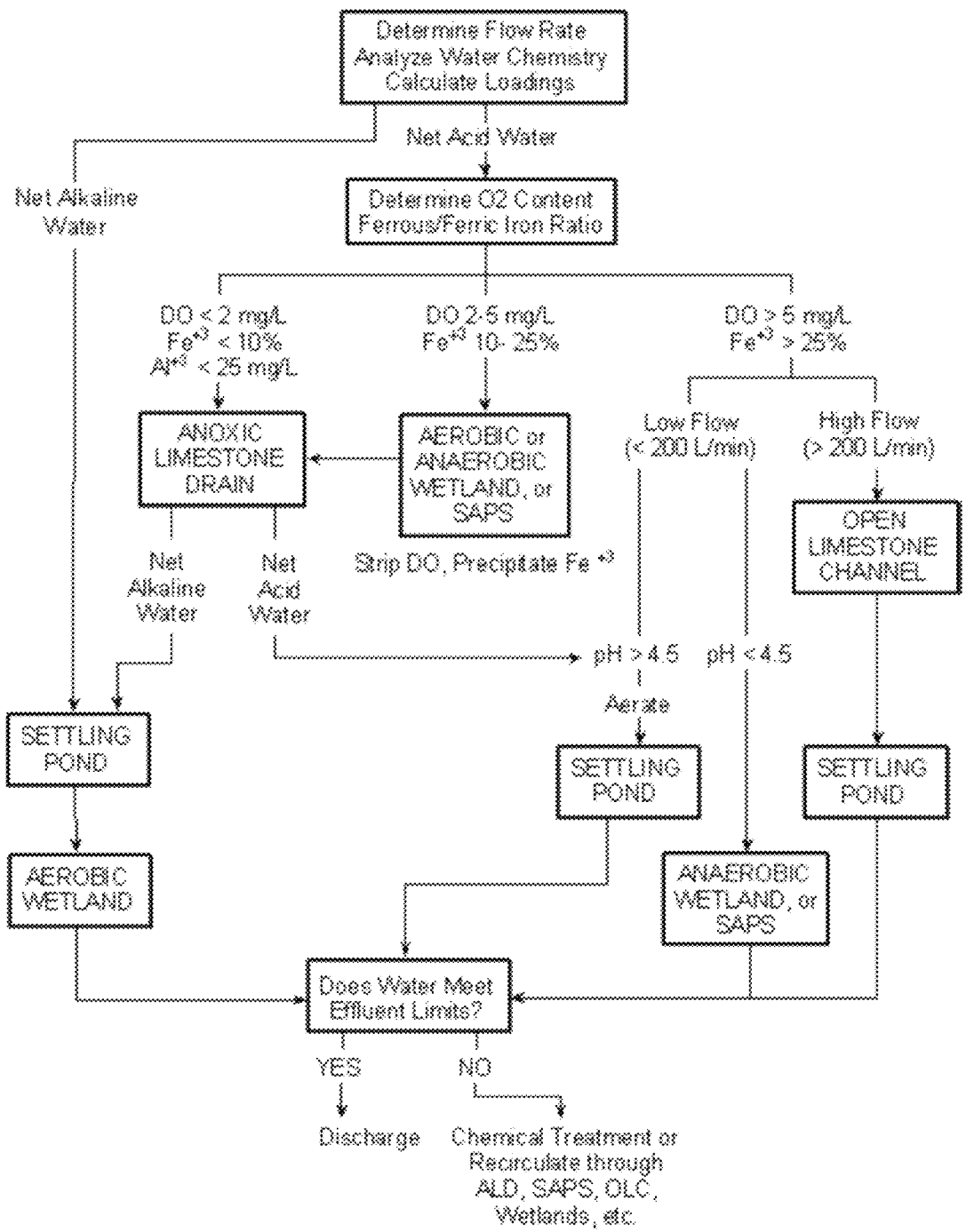
FIG. 6 is a flow diagram illustrating an exemplary method of selecting a passive system for treating impaired water that may be used with embodiments of the present invention.

FIG. 6 is a flow diagram illustrating an exemplary method of selecting a passive system for treating impaired water that may be used with embodiments of the present invention. Embodiments may include selection of passive system technologies or components based on a number of factors including water chemistry, flow rate, and local topography and site characteristics.

Any treatment methodology suitable for the treatment of impaired water may be employed in active or passive systems. Such treatments include but are not limited to: pH adjustment; aeration; metals removal, metal precipitation (e.g. iron, manganese, aluminum, etc.); primary equalization and precipitation; clarification, filtration, including microfiltration or high efficiency lamella filtration; reverse osmosis or other polishing technology, pre-chlorination, chlorination, coagulation, sedimentation, desalination, disinfection, dilution, etc.

The water treatment and conveyance system 100 may also include a discharge system 110 for discharging the treated water into mine stream 104a of the waterway 104. Discharge systems may include one or more of a plurality of conventional discharge components, such as pumps, pipes, weirs, gates, and the like.

The waterway 104 may then be used to convey the treated water from the upstream discharge location of the mine stream 104a to one or more remote downstream locations of the waterway 104. As shown in FIG. 1, the system 100 may also include one or more remote operational facilities 112 that withdraw water from the waterway 104 at the one or more remote locations of the waterway 104. For example, as shown in FIG. 1, the system 100 may include a plurality of remote operational facilities 112 and 114. The number of downstream remote operational facilities 112 and 114 and the locations of the downstream remote operational facilities 112 and 114 shown in FIG. 1 are merely exemplary. Other embodiments may include any number of downstream remote operational facilities at different locations.

In some embodiments, the remote operational facilities 112 and 114 may be downstream or upstream (upstream from a treated water discharging location) water withdrawing entities that withdraw the water from the waterway 104 at the one or more remote locations of the waterway 104 and then transport (e.g. via truck or pipeline) the withdrawn water to end users, such as natural gas companies for fracing. For example, as shown in FIG. 1, the remote operational facility 112 may be a downstream water withdrawing entity that withdraws the water from the waterway 104 at a location on the waterway 104 proximate to the operational facility 112 and then transports (e.g. via truck or pipeline) the withdrawn water to end users, such as a natural gas company (not shown). In some embodiments, the remote operational facilities 112 and 114 that withdraw the water from the waterway 104 at the one or more remote locations of the waterway 104 may be the end users themselves. For example, as shown in FIG. 1, the downstream remote operational facility 114 may itself be an end user, such as a natural gas company, that withdraws the water from the waterway 104 at a location proximate to the operational facility 114.

Figure 3:
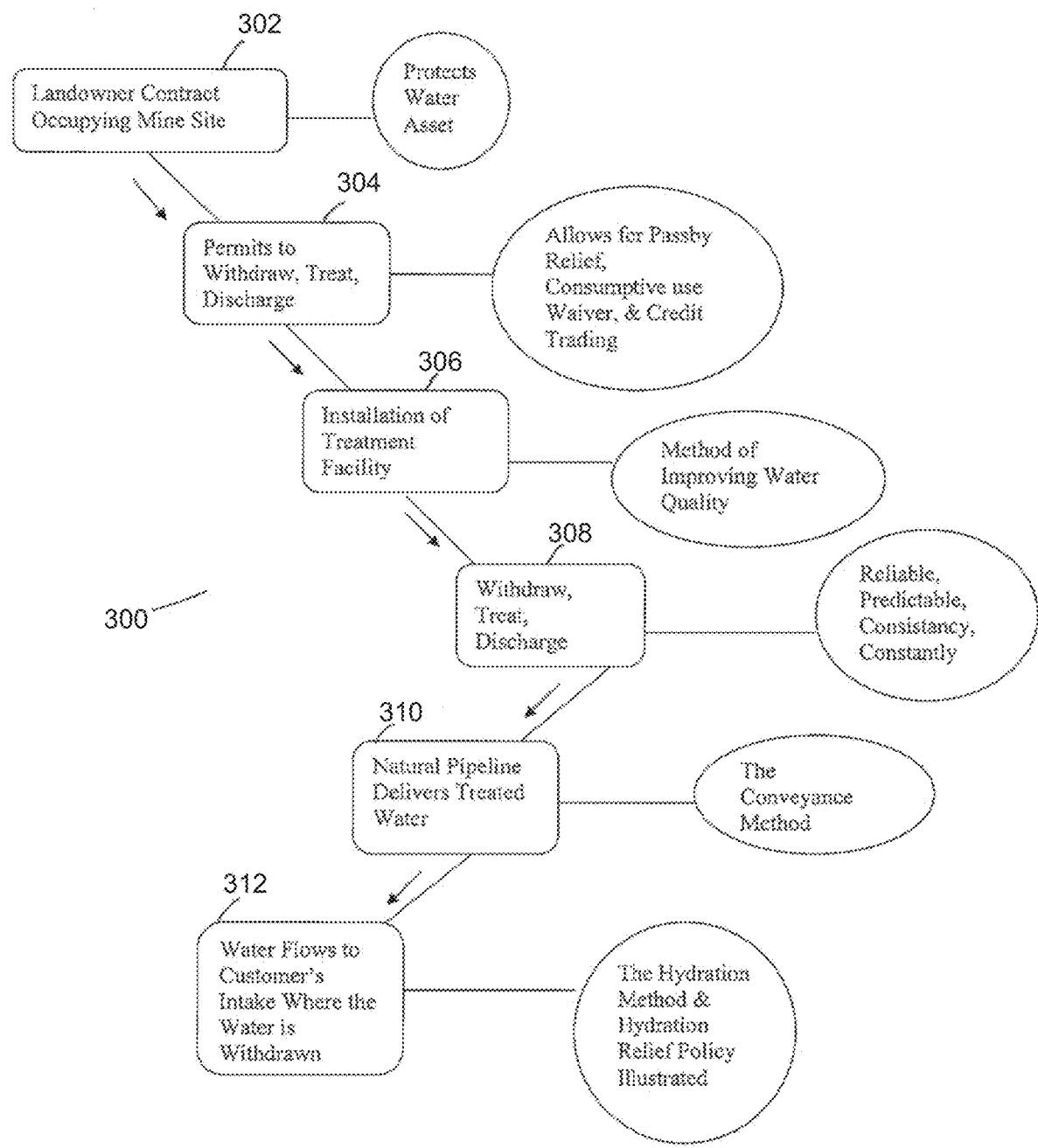
FIG. 3 is a flow diagram illustrating an exemplary method of supplying water using a natural water pipeline for use with embodiments of the present invention.

FIG. 3 is a flow diagram illustrating an exemplary method 300 of supplying water using a natural water pipeline for use with embodiments of the present invention. As shown at block 302, the method 300 may include acquiring rights to an impaired site from a private land owner or the government. In some embodiments, the method may include contracting (e.g. receiving a license) to perform processes on the site from a private land owner or the government. Prior to acquiring the ownership or license, the method may include identifying a plurality of impaired water sites and selecting one or more impaired water sites to acquire from the plurality of impaired water sites. The one or more impaired water sites may be selected based on factors such as amounts of impaired water and quality of water. For example, the quality of water or its location upstream or downstream of other sites may affect the cost and difficulty of treating the water to meet dischargeable specifications.

As shown at block 304, the method 300 may include receiving permission (e.g. via one or more permits) from a water rights granting entity, such as a government regulatory commission or agency (e.g. Susquehanna River Basin Commission (SRBC), Department of Environmental Protection (DEP) and the Environmental Protection Agency (EPA)). The permits may include permission to withdraw impaired water from an impaired water body, treat the impaired water and discharge the treated water into a waterway. One or more permits may be required from one or more entities.

According to one embodiment, in exchange for treating the impaired water and introducing the treated water flow into the waterway, the entity treating the impaired water and discharging the treated water (treating entity) may receive one or more water access rights from the water rights granting entity. The treating entity may then in turn provide (e.g. sell or transfer) portions (some or all) of the one or more water access rights to any paying entity in exchange for a monetary value which ultimately funds the clean-up operations (e.g. treating impaired water and discharging the treated water). The paying entities may include any non-treating entities that withdraw water from a waterway, such as remote operational facility 112. The paying entities may include any non-treating entities that do not withdraw water from a water way, such as: (i) an end user that pays for the rights but receives the water withdrawn by remote operational facility 112; or (ii) an environmental group. The non-treating entities may also receive one or more permits to withdraw water from the waterway and/or to transfer the one or more water access rights. According to another embodiment, the one or more water access rights may be provided directly to one or more non-treating entities from the water rights granting entity through a relationship with the treating entity, for introducing the treated water flow into the waterway. In some aspects, the paying entity may direct the treating entity to provide portions of the one or more water access rights to another non-treating entity. The treating entity may then in turn provide the portions of the one or more water access rights to the other non-treating entity as directed by the paying entity.

According to one aspect, the water access rights may be provided to the one or more downstream or upstream operational facilities by the water rights granting entity or the treating entity. In other aspects, the water access rights may be provided to any interested entity, such as environmental entities or groups who have an interest in protecting or improving local ecosystems and the environment. These other entities may then transfer the water access rights to downstream remote operational facilities that withdraw water from the waterway, or hold them as they see fit.

The water access rights may include a right to withdraw the water at one or more locations of the waterway 104 downstream or upstream from the discharge location of the waterway 104 when a flow level of the water is less than or equal to a predetermined pass-by water level threshold. In some embodiments, the water access rights may include a right to withdraw the water until the flow level of the water is less than or equal to a predetermined relief water level threshold that is lower than the predetermined pass-by water level threshold. That is, the water access rights may include a right to withdraw the water at a reduced or lower pass-by threshold. In some embodiments, the water access rights may include a right to withdraw the water at a reduced government fee, such as a consumptive use fee for the consumptive use of water that is less than the typically imposed fee. In some embodiments, the fee may be waived and the water access rights may include a right to withdraw the water without a consumptive use fee.

In some embodiments, water access rights may be in the form of credits. For example, one or more credits may be provided to the one or more entities, such as operational entities 112 and 114, and each of the one or more credits correlates to consideration paid to secure the rights to an amount of the water to be withdrawn at the one or more locations of the waterway 104.

Embodiments may include water rights that are transferrable and water rights that are non-transferrable. In some aspects, portions of the water rights may be sold, transferred, licensed or otherwise provided to entities such as one or more remote operational facilities. In some embodiments, water rights may include rights to withdraw water from one or more waterways. For example, an operational facility, such as operational facilities 112 and 114 may pay into a general clean-up fund or to clean-up an AMD site that is upstream on a waterway different from water way 104. Accordingly, any operational facility in any waterway could benefit from relief while paying for clean-up. Embodiments may include water rights that expire after a certain period of time, water rights that do not expire, water rights that are revocable and water rights that are non-revocable.

As shown at block 306, the method 300 may include installation of a treatment facility. As described above, the requirements for discharge water specifications will vary based on many factors, and may include passive systems or active systems or a combination of passive and active systems. The treatment system employed may vary in system type, as well as the number and type of treatments employed.

As shown at block 308, the impaired water may be withdrawn from an impaired water body, such as AMD water body 106 that is connected to a mine stream 104a of waterway 104. The impaired water withdrawn from the AMD water body 106 may then be treated and discharged into a waterway connected to the impaired water body, such as mine stream 104a of waterway 104. As shown at block 310, the treated water may be conveyed via the waterway 104 downstream to one or more locations proximate to remote operational facilities 112 and 114 that withdraw water from the waterway 104. As shown at block 312, the treated water may flow to water withdrawing operational facilities, such as withdrawing operational facilities 112 and 114.

As described above, at least a portion of one or more water access rights to withdraw water may be provided. For example, at least a portion of one or more water access rights to withdraw water may be provided. In one embodiment, the rights may be provided via a contract where an entity (e.g. a downstream operational facility receives at least a portion of one or more water access rights and the entity providing the water rights (e.g. permit receiving entity that treats and discharges the water) receives consideration providing the water rights. The consideration may include a monetary value, a trade of services, and a promise to pay a monetary value.

Figure 4:
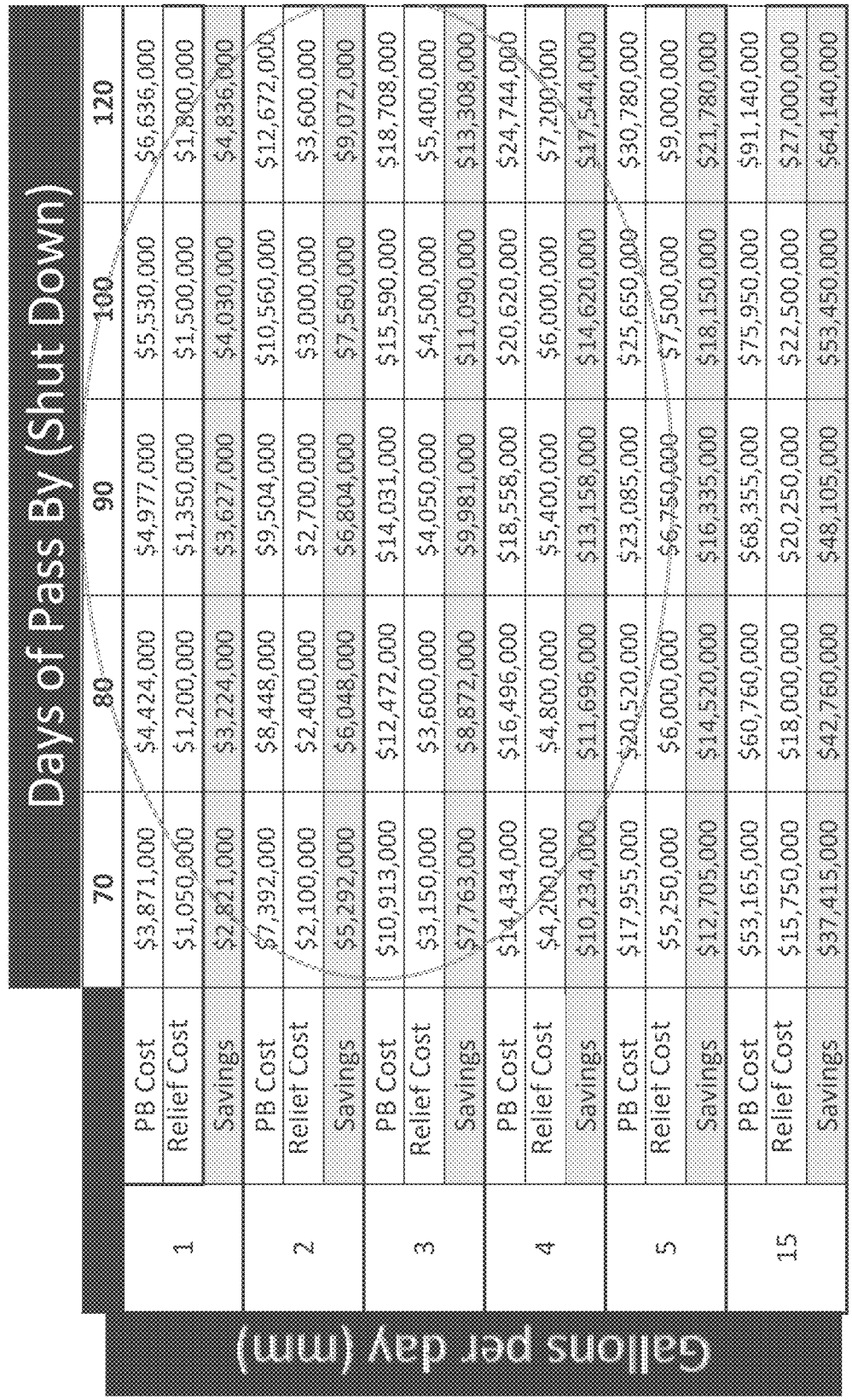
FIG. 4 is a chart illustrating exemplary cost comparisons of conventional pass-by costs to natural pipeline relief costs based on amounts of water to be withdrawn for a number of days for use with embodiments of the present invention.

FIG. 4 is a chart illustrating exemplary cost comparisons of conventional pass-by costs to natural pipeline relief costs based on amounts of water to be withdrawn for a number of days for use with embodiments disclosed herein. The rows of the chart 400 correspond to millions of gallons of water to be withdrawn per day and the columns correspond to the number of days of pass-by shut down. As shown in the chart 400, the monetary value (in dollars) may be based on an amount of the water (in millions of gallons per day) to be withdrawn for a predetermined amount of time when a flow level of the water is less than or equal to a predetermined pass-by water level threshold (days of pass-by shutdown). For example, as shown in FIG. 4, a water withdrawing entity may pay a monetary value of $2,700,000 to withdraw 2 million gallons of water per day for 90 days of pass-by shut down. In one embodiment, each specific monetary value (e.g. $2,700,000) and the corresponding amount of the water to be withdrawn (e.g. 2 million gallons of water per day) for a predetermined amount of time (e.g. 90 days) may be represent a selectable water access rights option provided to a water withdrawing entity. In some aspects, a water withdrawing entity may be provided with a plurality of selectable water access rights options as shown at FIG. 4. A water withdrawing entity may then choose a water access rights option based on any number of factors, such as pass-by shut down days in past years and projected pass-by shut down days in the future.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method of providing access to water in a natural pipeline, comprising:
    receiving, at an impaired water discharge location, a notification that permission was granted from a water rights granting entity to withdraw water from an impaired water body located proximate to the natural pipeline, wherein the impaired water body comprises at least one of an acid mine or mining drainage canal, a mining drainage channel, an overflow channel, or a mine pool water body;

withdrawing, with at least one pump at the impaired water discharge location, impaired water from the impaired water body based on receiving the notification;

cleaning the impaired water using a water treatment system to obtain treated water;

discharging the treated water from the treatment system into the natural pipeline;

receiving a notification indicating that a water withdrawal allowance was granted by the water rights granting entity as a result of the withdrawing, cleaning, and discharging the water; and withdrawing, with at least one pump at a remote operational facility, water from the natural pipeline at a location associated with the remote operational facility based on a transfer of the water withdrawal allowance to the remote operational facility, wherein the water withdrawal from the natural pipeline occurs when a flow level of the water in the natural pipeline is less than or equal to a predetermined pass-by water level threshold.

2. The method of claim 1, wherein the water treatment system is a man-made passive treatment system that relies on a natural flow of water through the passive treatment system to produce the treated water.

3. The method of claim 2, wherein the man-made passive treatment system comprises at least one of a constructed wetland, a limestone pond, and an open limestone channel.

4. The method of claim 1, wherein the remote operational facility comprises at least one of a utility, pipeline, or municipality operation.

5. The method of claim 1, further comprising testing whether the treated water meets one or more effluent limits and only discharging treated water that meets the one or more effluent limits into the natural pipeline.

6. The method of claim 1, wherein the notification that permission was granted includes one or more permits.

7. The method of claim 1, wherein the withdrawing of the impaired water from the impaired water body comprises withdrawing free flowing water from the impaired water body.

8. The method of claim 1, wherein the withdrawing of the impaired water from the impaired water body further comprises withdrawing stored water from the impaired water body.

* * * * *